(12) United States Patent
Smith (10) Patent No.: US 8,380,566 B2
(45) Date of Patent: Feb. 19, 2013

(54) INTERACTIVE VOTING OR SURVEY (75) Inventor: Glen David Smith, Auckland (NZ)

(73) Assignee: Zyzeba Holdings Limited, Auckland (NZ)

( * ) Notice: Subject to any disclaimer, the term of this patent is extended or adjusted under 35 U.S.C. 154(b) by 0 days.

(21) Appl. No.: 13/568,727

(22) Filed: Aug. 7, 2012

(65) Prior Publication Data

US 2012/0303460 A1 Nov. 29, 2012

Related U.S. Application Data

(62) Division of application No. 10/240,775, filed as application No. PCT/NZ01/00051 on Apr. 5, 2001, now Pat. No. 8,249,920.

(30) Foreign Application Priority Data

Apr. 7, 2000 (NZ) ........................................ 503817

(51) Int. Cl.
*G06Q 30/00* (2012.01)
(52) U.S. Cl. ..................................................... 705/14.1
(58) Field of Classification Search .................. 705/14.1
See application file for complete search history.

(56) References Cited

U.S. PATENT DOCUMENTS

| | | | |
|---|---|---|---|
| 3,502,813 A | 3/1970 | Walker | |
| 4,290,141 A | 9/1981 | Anderson et al. | |
| 4,962,377 A | 10/1990 | Wallace et al. | |
| 5,226,177 A | 7/1993 | Nickerson | |
| 5,263,723 A | 11/1993 | Pearson et al. | |
| 5,365,551 A | 11/1994 | Snodgrass et al. | |
| 5,377,354 A | 12/1994 | Scannell et al. | |
| 5,403,999 A | 4/1995 | Entenmann et al. | |
| 5,473,673 A | 12/1995 | Van Wijk et al. | |
| 5,500,650 A | 3/1996 | Snodgrass et al. | |
| 5,577,103 A | 11/1996 | Foti | |
| 5,579,372 A | 11/1996 | Astrom | |
| 5,627,544 A | 5/1997 | Snodgrass et al. | |
| 5,717,866 A * | 2/1998 | Naftzger ................... | 705/14.38 |
| 5,768,509 A | 6/1998 | Gunluk | |
| 5,774,534 A | 6/1998 | Mayer | |
| 5,794,210 A | 8/1998 | Goldhaber et al. | |
| 5,838,774 A | 11/1998 | Weisser, Jr. | |
| 5,852,775 A | 12/1998 | Hidary | |
| 5,857,156 A | 1/1999 | Anderson | |
| 5,937,390 A * | 8/1999 | Hyodo ....................... | 705/14.61 |

(Continued)

FOREIGN PATENT DOCUMENTS

| | | |
|---|---|---|
| AU | 200113825 | 5/2001 |
| AU | 2001100406 | 11/2001 |

(Continued)

OTHER PUBLICATIONS

"In Paegas Brand Stores You can Buy a Mobile Phone on Instalments Too", T-Mobile Press Centre, http://en.t-press.cz/tiskove_zpravy/2000/143/, Apr. 5, 2000.

(Continued)

*Primary Examiner* — Daniel Lastra
(74) *Attorney, Agent, or Firm* — Young & Thompson (57) ABSTRACT

An interactive direct response system combines the use of short text message systems (SMS) via cell phones (100) with a database (102) and website to enable advertisers to view in real time customer responses to a direct response campaign. Customers are invited to respond to a defined advertisement on for example a billboard by responding to a single telephone number associated with the website by sending a text message linked to that particular advertisement, i.e. a single word (104,106). A computer receives and analyses the responses and sends an acknowledgement message to the customer.

34 Claims, 7 Drawing Sheets

Example: Billboard Advertisement

U.S. PATENT DOCUMENTS

| | | | |
|---|---|---|---|
| 5,937,392 | A | 8/1999 | Alberts |
| 5,946,629 | A | 8/1999 | Sawyer et al. |
| 5,948,061 | A | 9/1999 | Merriman et al. |
| 5,960,409 | A * | 9/1999 | Wexler ............... 705/14.41 |
| 5,970,385 | A | 10/1999 | Pykalisto |
| 5,983,196 | A | 11/1999 | Wendkos |
| 5,984,367 | A | 11/1999 | Barnhart et al. |
| 6,006,197 | A | 12/1999 | d'Eon et al. |
| 6,009,409 | A | 12/1999 | Adler et al. |
| 6,044,135 | A | 3/2000 | Katz |
| 6,047,194 | A * | 4/2000 | Andersson ............... 455/466 |
| 6,052,591 | A | 4/2000 | Bhatia |
| 6,114,969 | A | 9/2000 | Hymel |
| 6,151,507 | A | 11/2000 | Laiho et al. |
| 6,154,646 | A | 11/2000 | Tran et al. |
| 6,286,005 | B1 | 9/2001 | Cannon |
| 6,295,528 | B1 | 9/2001 | Marcus et al. |
| 6,332,127 | B1 * | 12/2001 | Bandera et al. ............ 705/14.55 |
| 6,388,561 | B1 | 5/2002 | Tuttle |
| 6,415,156 | B1 | 7/2002 | Stadelmann |
| 6,470,079 | B1 | 10/2002 | Benson |
| 6,470,181 | B1 | 10/2002 | Maxwell |
| 6,493,558 | B1 | 12/2002 | Bernhart et al. |
| 6,505,052 | B1 | 1/2003 | Jou |
| 6,512,926 | B1 | 1/2003 | Henry-Labordere |
| 6,560,456 | B1 | 5/2003 | Lohtia et al. |
| 6,564,261 | B1 | 5/2003 | Gudjonsson et al. |
| 6,647,256 | B1 | 11/2003 | Stewen et al. |
| 6,671,513 | B1 | 12/2003 | Frank et al. |
| 6,754,641 | B2 | 6/2004 | Kolls |
| 7,010,263 | B1 | 3/2006 | Patsiokas |
| 2001/0016819 | A1 | 8/2001 | Kolls |
| 2002/0013711 | A1 | 1/2002 | Ahuja et al. |
| 2002/0044058 | A1 | 4/2002 | Heinrich et al. |
| 2002/0132575 | A1 | 9/2002 | Kesling et al. |
| 2003/0036395 | A1 | 2/2003 | Proidl |
| 2003/0079135 | A1 | 4/2003 | Jones |
| 2003/0145037 | A1 | 7/2003 | Von Garssen |
| 2003/0194350 | A1 | 10/2003 | Stamatelos et al. |
| 2003/0200173 | A1 | 10/2003 | Chang |
| 2003/0219709 | A1 | 11/2003 | Olenick et al. |
| 2004/0010630 | A1 | 1/2004 | Becher-Wickes et al. |
| 2004/0014454 | A1 | 1/2004 | Burgess et al. |
| 2004/0078340 | A1 | 4/2004 | Evans |
| 2004/0088244 | A1 | 5/2004 | Bartter et al. |
| 2004/0097245 | A1 | 5/2004 | Sheth et al. |
| 2004/0116128 | A1 | 6/2004 | Chen |
| 2004/0116136 | A1 | 6/2004 | Voehringer |
| 2004/0132530 | A1 | 7/2004 | Rutanen |
| 2004/0176081 | A1 | 9/2004 | Bryham et al. |
| 2004/0176666 | A1 | 9/2004 | Chait |
| 2004/0198329 | A1 | 10/2004 | Vasa |
| 2004/0209677 | A1 | 10/2004 | Park et al. |

FOREIGN PATENT DOCUMENTS

| | | |
|---|---|---|
| BG | 107073 | 3/2004 |
| CA | 2 405 221 | 10/2001 |
| CA | 2 354 535 | 7/2004 |
| CA | 2 418 638 | 8/2004 |
| CN | 1 432 949 | 7/2003 |
| CN | 1 437 376 | 8/2003 |
| DE | 199 38 201 | 2/2001 |
| DE | 10 133 887 | 1/2003 |
| DE | 10 235 547 | 10/2003 |
| DE | 10 246 650 | 4/2004 |
| DE | 10 251 024 | 5/2004 |
| DE | 10 252 697 | 5/2004 |
| EP | 833469 | 1/1998 |
| EP | 0 896 484 | 2/1999 |
| EP | 0 896 484 A2 | 2/1999 |
| EP | 986273 | 3/2000 |
| EP | 1091607 | 4/2001 |
| EP | 1096405 | 5/2001 |
| EP | 1109414 | 6/2001 |
| EP | 1139116 | 10/2001 |
| EP | 1184818 | 3/2002 |
| EP | 986275 | 7/2002 |
| EP | 1274262 | 1/2003 |
| EP | 1385297 | 1/2004 |
| FI | 982833 | 8/2000 |
| FR | 2845846 | 4/2004 |
| GB | 2308474 | 6/1997 |
| GB | 2373138 | 9/2002 |
| GB | 2384604 | 7/2003 |
| GB | 2387702 | 10/2003 |
| GB | 2390915 | 1/2004 |
| GB | 2393833 | 4/2004 |
| GB | 2400225 | 6/2004 |
| GB | 2399669 | 9/2004 |
| KR | 1020020051810 | 6/2002 |
| KR | 1020020056985 | 7/2002 |
| KR | 1020020059070 | 7/2002 |
| KR | 1020020061747 | 7/2002 |
| KR | 1020030005754 | 1/2003 |
| KR | 1020030029601 | 4/2003 |
| KR | 1020030048662 | 6/2003 |
| KR | 1020030050399 | 6/2003 |
| KR | 1020030078410 | 10/2003 |
| KR | 1020030079161 | 10/2003 |
| KR | 1020030084859 | 11/2003 |
| KR | 1020030087996 | 11/2003 |
| KR | 1020030093799 | 12/2003 |
| NZ | 330703 | 3/2000 |
| NZ | 501706 | 8/2001 |
| NZ | 522421 | 2/2003 |
| NZ | 503817 | 5/2003 |
| TW | 513651 | 12/2002 |
| WO | WO 88/05239 | 7/1988 |
| WO | WO 96/13814 | 5/1996 |
| WO | WO 97/17682 | 5/1997 |
| WO | 97/31306 | 8/1997 |
| WO | WO 97/31306 | 8/1997 |
| WO | WO 97/49251 | 12/1997 |
| WO | WO 98/09255 | 3/1998 |
| WO | WO 98/09451 | 3/1998 |
| WO | WO 98/18251 | 4/1998 |
| WO | WO 98/47270 | 10/1998 |
| WO | WO 98/48587 | 10/1998 |
| WO | WO 99/01826 | 1/1999 |
| WO | WO 99/34272 | 7/1999 |
| WO | WO 99/42964 | 8/1999 |
| WO | WO 99/49680 | 9/1999 |
| WO | WO 99/59283 | 11/1999 |
| WO | WO 99/65256 | 12/1999 |
| WO | WO 99/66701 | 12/1999 |
| WO | 00/04476 | 1/2000 |
| WO | WO 00/04476 | 1/2000 |
| WO | 00/18106 | 3/2000 |
| WO | WO 00/18106 | 3/2000 |
| WO | 00/21293 | 4/2000 |
| WO | WO 00/21293 | 4/2000 |
| WO | WO 00/22906 | 4/2000 |
| WO | WO 00/22907 | 4/2000 |
| WO | 00/35216 | 6/2000 |
| WO | WO 00/22908 | 6/2000 |
| WO | WO 00/35216 | 6/2000 |
| WO | WO 00/41415 | 7/2000 |
| WO | 00/62518 | 10/2000 |
| WO | WO 00/62518 | 10/2000 |
| WO | WO 00/62564 | 10/2000 |
| WO | WO 00/72612 | 11/2000 |
| WO | 00/76235 | 12/2000 |
| WO | WO 00/76235 | 12/2000 |
| WO | WO 01/13298 | 2/2001 |
| WO | WO 01/13341 | 2/2001 |
| WO | WO 01/22748 | 3/2001 |
| WO | WO 01/23055 | 4/2001 |
| WO | WO 01/37540 | 5/2001 |
| WO | WO 01/37595 | 5/2001 |
| WO | WO 01/47291 | 6/2001 |
| WO | WO 01/52541 | 7/2001 |
| WO | WO 01/52558 | 7/2001 |
| WO | WO 01/52572 | 7/2001 |
| WO | WO 01/67718 | 9/2001 |
| WO | WO 01/71949 | 9/2001 |
| WO | WO 01/75823 | 10/2001 |

| | | |
|---|---|---|
| WO | WO 01/76173 | 10/2001 |
| WO | WO 01/77978 | 10/2001 |
| WO | WO 01/98983 | 12/2001 |
| WO | WO 02/11088 | 2/2002 |
| WO | WO 02/13120 | 2/2002 |
| WO | WO 02/21416 | 3/2002 |
| WO | WO 02/27629 | 4/2002 |
| WO | WO 02/44829 | 6/2002 |
| WO | WO 02/076122 | 9/2002 |
| WO | WO 02/101584 | 12/2002 |
| WO | WO 03/083737 | 10/2003 |
| WO | WO 03/084187 | 10/2003 |
| WO | WO 03/084252 | 10/2003 |
| WO | WO 2004/010361 | 1/2004 |
| WO | WO 2004/034212 | 4/2004 |
| WO | WO 2004/049716 | 6/2004 |
| WO | WO 2004/068386 | 8/2004 |
| WO | WO 2004/068880 | 8/2004 |

OTHER PUBLICATIONS

"RadioMobilA's Revenues Reached The Boundary of 11 Billion Crowns In 1999", T-Mobile Press Centre, http://en.t-press.cz/tiskove_zpravy/2000/141/, Apr. 4, 2000.

"Name of the Prague WritersA'Festival Is Connected With The Paegas Brand Again", T-Mobile Press Centre, http://en.t-press.cz/tiskove_zpravy/2000/142/, Apr. 4, 2000.

"Novelties for Apr.: Paegas Offers Three Phones Supporting WAP", T-Mobile Press Centre, http://en.t-press.cz/tiskove_zpravy/2000/140/, Mar. 31, 2000.

"Only Users of Paegas Services Can Use GSM Banking", T-Mobile Press Centre, http://en.t-press.cz/tiskove_zpravy/2000/138/, Mar. 23, 2000.

"As The First In The World, Paegas Offers GSM Banking on Prepaid Cards", T-Mobile Press Centre, http://en.t-press.cz/tiskove_zpravy/2000/137/, Mar. 23, 2000.

"RadioMobil Rises On The Chart Of The Most Admired Czech Companies", T-Mobile Press Centre, http://en.t-press.cz/tiskove_zpravy/2000/136/, Mar. 23, 2000.

"Practically All Users of Paegas Services Tried A Half Price Call", T-Mobile Press Centre, http://en.t-press.cz/tiskove_zpravy/2000/135/, Mar. 21, 2000.

"Paegas Comes With A World Unique Service For Foreign Customers", T-Mobile Press Centre, http://en.t-press.cz/tiskove_zpravy/2000/134/, Mar. 20, 2000.

"All Users of Paegas Services Will Celebrate the Overstepping of the Million Boundary", T-Mobile Press Centre, http://en.t-press.cz/tiskove_zpravy/2000/133/, Mar. 14, 2000.

"Paegas Is the First GSM Network Offering Data and Fax for Free to All Customers", T-Mobile Press Centre, http://en.t-press.cz/tiskove_zpravy/2000/131/, Mar. 8, 2000.

"TWIST Is the First Pre-paid Service Allowing W@P Applications", T-Mobile Press Centre, http://en.t-press.cz/tiskove_zpravy/2000/130/, Mar. 8, 2000.

"You Can Get The Most Advantageous Pre-paid Service Paegas Twist for Only CZK 1 399", T-Mobile Press Centre, http://en.t-press.cz/tiskove_zpravy/2000/1291, Mar. 6, 2000.

"RadioMobil Invests Billions into Its Network Every Year", T-Mobile Press Centre, http://en.t-press.cz/tiskove_zpravy/2000/128/, Feb. 23, 2000.

"Awards received by RadioMobil in 1999-2000:", T-Mobile Press Centre, http://en.t-press.cz/tiskove_zpravy/2000/1261, Feb. 21, 2000.

"Paegas Twist, the most successful prepaid service in the Czech Republic, is also the cheapest", T-Mobile Press Centre, http://en.t-press.cz/tiskove_zpravy/2000/125/, Feb. 17, 2000.

"Paegas to expand its offer of WAP services", T-Mobile Press Centre, http://en.t-press.czniskove_zpravy/2000/1241, Feb. 15, 2000.

"For the first time in the Czech Republic, a single operator earned more than 500,000 new customers in one year", T-Mobile Press Centre, http://en.t-press.cz/tiskove_zpravy/2000/122/, Jan. 6, 2000.

"Paegas dominates the mobile communications market in the Czech Republic", T-Mobile Press Centre, http://en.t-press.cz/tiskove_zpravy/1999/121/, Dec. 6, 1999.

"Pre-Christmas innovcations from Paegas", T-Mobile Press Centre, http://en.t-press.cz/tiskove_zpravy/1999/118/, Nov. 30, 1999.

"With Paegas Gold certificate, mobile telephone activation is free", T-Mobile Press Centre, http://en.t-press.cz/tiskove_zpravy/1999/117/, Nov. 22, 1999.

"The indoor stadium (Sportovni hala) at Pragues Exhibition Grounds (VystavistA?) is to be named Paegas Arena", T-Mobile Press Centre, http://en.t-press.cz/tiskove_zpravy/1999/116/, Nov. 18, 1999.

"Paegas hosts prominent world dignitaries", T-Mobile Press Centre, http://en.t-press.cz/tiskove_zpravy/1999/115/, Nov. 16, 1999.

"A Christmas present from Paegas to every new customer", T-Mobile Press Centre, http://en.t-press.cz/tiskove_zpravy/1999/113/, Nov. 10, 1999.

"Announcement", T-Mobile Press Centre, http://en.t-press.cz/tiskove_zpravy/1999/112/, Nov. 9, 1999.

"Louny Call Center commences operation", T-Mobile Press Centre, http://en.t-press.cz/tiskove_zpravy/1999/1111, Nov. 5, 1999.

"The biggest advantages while travelling abroad are available with Twist", T-Mobile Press Centre, http://en.t-press.cz/tiskove_zpravy/1999/110/, Nov. 4, 1999.

"Paegas customers can now communicate in seven languages", T-Mobile Press Centre, http://en.t-press.cz/tiskove_zpravy/1999/109/, Nov. 1, 1999.

"Paegas Nej-call your friends at a discount of up to 50%", T-Mobile Press Centre, http://en.t-press.cz/tiskove_zpravy/1999/108/, Nov. 1, 1999.

"The Czech public regards RadioMobil as one of the most go-ahead companies-and one of the most expanding", T-Mobile Press Centre, http://en.t-press.cz/tiskove_zpravy/1999/107/, Oct. 11, 1999.

"Coca-Cola Via the Paegas Network", T-Mobile Press Centre, http://en.t-press.cz/tiskove_zpravy/1999/102/, Oct. 4, 1999.

"RadioMobil has received confirmation that it has fulfilled the licence conditions", T-Mobile Press Centre, http://en.t-press.cz/tiskove_zpravy/1999/96/, Aug. 13, 1999.

"Paegas Internet Call: Better and faster international connections at advantageous prices", T-Mobile Press Centre, http://en.t-press.cz/tiskove_zpravy/1999/93/, Jul. 27, 1999.

"Paegas is winning the battle for customers", T-Mobile Press Centre, http://en.t-press.cz/tiskove_zpravy/1999/92/, Jul. 16, 1999.

"Mobile Internet Becomes Reality in the Paegas Network Thanks to the GPRS Technology", T-Mobile Press Centre, http://en.t-press.cz/tiskove_zpravy/1999/91/, Jul. 14, 1999.

"Hot Festival News in a Mobile", T-Mobile Press Centre, http://en.t-press.cz/tiskove_zpravy/1999/88/, Jul. 1, 1999.

"Paegas opens its 20th outlet", T-Mobile Press Centre, http://en.t-press.cz/tiskove_zpravy/1999/89/, Jul. 1, 1999.

"Easy Travelling Around the World with Paegas", T-Mobile Press Centre, http://en.t-press.cz/tiskove_zpravy/1999/87/, Jun. 24, 1999.

"Paegas Assistant 333 gets enthusiastic response", T-Mobile Press Centre, http://en.t-press.cz/tiskove_zpravy/1999/81/, May 28, 1999.

"Paegas no longer 603 but 604 as well", T-Mobile Press Centre, http://en.t-press.cz/tiskove_zpravy/1999/82/, May 28, 1999.

"The widest offer of Paegas Twist packets and other news in half of May", T-Mobile Press Centre, http://en.t-press.cz/tiskove_zpravy/1999/78/, May 14, 1999.

"WAP Technology Brings Internet to Paegas GSM Mobile Telephones", T-Mobile Press Centre, http://en.t-press.cz/tiskove_zpravy/1999/77/, May 10, 1999.

"Customers in the Czech Republic prefer GSM services", T-Mobile Press Centre, http://en.t-press.cz/tiskove_zpravy/1999/71/, May 3, 1999.

"Paegas Asistent 333: effective, quick and safe communication", T-Mobile Press Centre, http://en.t-press.cz/tiskove_zpravy/1999/73/, May 3, 1999.

"Mobile with Paegas SIM Toolkit Twist card only 4,499 KAT", T-Mobile Press Centre, http://en.t-press.cz/tiskove_zpravy/1999/68/, Apr. 14, 1999.

"Paegas services collect more awards", T-Mobile Press Centre, http://en.t-press.cz/tiskove_zpravy/1999/65/, Apr. 1, 1999.

"Paegas: new offerings for April", T-Mobile Press Centre, http://en.t-press.cz/tiskove_zpravy11999/66/, Apr. 1, 1999.

"Paegas offers lowest prices on telecommunications services", T-Mobile Press Centre, http://en.t-press.cz/tiskove_zpravy/1999/64/, Mar. 31, 1999.

"Paegas Customers Have Been Able to Call Even From Prague Underground Since Friday, Mar. 19, 1999!", T-Mobile Press Centre, http://en.t-press.cz/tiskove_zpravy/1999/62/, Mar. 19, 1999.

"RadioMobil named most-respected telecommunications company in Czech Republic", T-Mobile Press Centre, http://en.t-press.cz/tiskove_zpravy/1999/57/, Mar. 4, 1999.

"m-Wise Launches First-Ever Interactive Text Messaging Competition," M-Wise press release of Nov. 20, 2000, from m-Wise website.

"First Interactive Texting Competition Proves a Winner, "M-Wise press release of Dec 4, 2000, from m-Wise website.

"RadioMobil forced to halt Paegas Internet Call service at 5:00 p. m. today", T-Mobile Press Centre, http://en.t-press.cz/tiskove_zpravy/1999/56/, Feb. 25, 1999.

"Over 1 million SMS messages sent using prepaid Twist cards", T-Mobile Press Centre, http://en.t-press.cz/tiskove_zpravy/1999/54/, Feb. 16, 1999.

"RadioMobil to become main partner of Czech National Basketball Federation", T-Mobile Press Centre, http://en.t-press.cz/tiskove_zpravy/1999/55/, Feb. 16, 1999.

"Europe for 9.50 Kc, international for 12.90 Kc per minute", T-Mobile Press Centre, http://en.t-press.cz/tiskove_zpravy/1999/53/, Jan. 28, 1999.

"Paegas GSM network covers 96 percent of Czech population", T-Mobile Press Centre, http://en.t-press.cz/tiskove_zpravy/1999/52/, Jan. 22, 1999.

"Paegas TWIST becomes first system to successfully transmit SMS", T-Mobile Press Centre, http://en.t-press.cz/tiskove_zpravy/1999/49/, Jan. 14, 1999.

"Paegas growth outstrips Czech mobile communications market by wide margin", T-Mobile Press Centre, http://en.tpress.cz/tiskove_zpravy/1999/50/, Jan. 14, 1999.

"No monthly fees, telephones for 1 Kc beginning in January", T-Mobile Press Centre, http://en.t-press.cz/tiskove_zpravy/1998/48/, Dec. 31, 1998.

"Paegas donates half a million crowns to 1st Children's Clinic of Motol Faculty Hospital", T-Mobile Press Centre, http://en.t-press.cz/tiskove_zpravy/1998/47/, Dec. 18, 1998.

"Paegas issues first directory of GSM users in Czech Republic", T-Mobile Press Centre, http://en.t-press.cz/tiskove_zpravy/1998/45/, Nov. 30, 1998.

"Paegas GSM offers for December Paegas Twist packages include two Mobile of the Year winners", T-Mobile Press Centre, http://en.t-press.cz/tiskove_zpravy/1998/46/, Nov. 30, 1998.

"Paegas becomes main partner to Mobile of the Year survey", T-Mobile Press Centre, http://en.t-press.cz/tiskove_zpravy/1998/44/, Nov. 26, 1998.

"Paegas rapidly increasing number of transmission stations", T-Mobile Press Centre, http://en.t-press.cz/tiskove_zpravy/1998/32/, Nov. 24, 1998.

"First Interactive Texting Competition Proves a Winner," M-Wise press release of Dec. 4, 2000, from m-Wise website.

* cited by examiner

Example: Billboard Advertisement

| PROMOTIONS >>>>> | PROTOKEY | CSTOKE2 | DRINKCO | PHONECO1 | PHONECO2 | PIZZA | BURGER | VOTE YES | VOTE NO | SPORT&CO | test | LOTTO | JOKE1 | EDIT | EDIT STOP |
|---|---|---|---|---|---|---|---|---|---|---|---|---|---|---|---|
| NUMBER OF PROMOTIONS: 16 | PENTIUM | INTL INSIDE | cola | ERRICSON | NOKIA 6110 | SUPREME | combo | yes | no | TENNIS | TEST | lotto | joke | EDIT | edit stop |
| | PENT | INTEL | pepsi | ERICSSON | NOKIA 6 | SOPREME | com bo | | | TENIS | AF | | | edit news | edi stp |
| Gateway Controls | | INSIDE | Koke | ERICS | NOKIA | SUPER | | | | ten ies | | | | datatag | edistop |
| | | INTEL | | ERRIC | NOKEA | PREME | | | | TENI | | | | data tag | stop edit |
| | | | | | 610 | PREM | | | | | | | | | stop edit |
| | | | | | ok | | | | | | | | | | datatag stop |
| | | | | | | | | | | | | | | | data tag stop |
| | | | | | | | | | | | | | | | stop |
| | 2 | 4 | 4 | 4 | 10 | 5 | 2 | 1 | 1 | 4 | 2 | 1 | 1 | 4 | 8 |
| | 4 | 8 | 1 | 3 | 34 | 10 | 10 | 78 | 77 | | 3 | 7 | 1 | 5 | 3 |
| PROMOTION MATCH DATA >> | 80 | 80 | 80 | 80 | 80 | 81 | 160 | 76 | | 55 | 128 | 52 | 95 | 83 | 63 |
| Response Message >> | 115 | | | | | | | | | | | | | | |
| Reply characters left | | | | | | | | | | | | | | | 0 |
| NUMBER OF NON HITS >> | | | | | | | | | | | | | | | 160 |
| Response Message >> | | | | | | | | | | | | | | | |

INTERACTIVE VOTING OR SURVEY

CROSS REFERENCE TO RELATED APPLICATIONS

This application is a division of co-pending application Ser. No. 10/240,775 filed on Sep. 12, 2003, which is a National Stage of PCT/NZ01/00051 filed on Apr. 5, 2001, which claims priority to New Zealand Application No. 503817 filed on Apr. 7, 2000. The entire content of each of these applications is hereby expressly incorporated by reference.

FIELD OF THE INVENTION

This invention relates to an interactive marketing and/or survey system in particular but not limited to a marketing and/or survey system utilising short message services (SMS) provided on mobile or cell phones.

BACKGROUND ART

Traditional marketing and survey techniques have required survey companies to use pollsters to contact consumers by telephone and ask a series of questions, and then to have that data entered by the pollster or data entry clerk into a database. Some surveys are conducted by mail, and some marketing techniques request the consumer to fill out a pre printed reply card, mail it to the advertiser, and then the results are entered by a data entry clerk and the results analysed. All this takes time for the consumer, is costly for the advertiser and in any event has a considerable lag between the compiling of the questions and analysing the results.

OBJECT OF THE INVENTION

It is an object of the present invention to provide a viable interactive marketing and/or survey system based on SMS messages, transmitted to mobile or cell phones or to at least provide the public with a useful choice.

SUMMARY OF THE INVENTION

In one aspect the invention provides an interactive marketing and/or survey system utilising short message systems (SMS) provided on mobile or cell phones including in combination a means of displaying an advertisement, the advertisement inviting a participant to respond with a defined short text message via SMS on a mobile or cell phone, computerised means for comparing and matching the participants short text message with one or more retained reference records, wherein in operation, if the participant's short text message matches any of the one or more records, information from the message is stored in a database.

Preferably the advertisement invites participants to respond to a common "reply to" telephone number.

Preferably all advertisements associated with the system use the same common "reply to" telephone number but each advertising campaign uses distinct pre-allocated short text message(s) and the computerised means analyses and displays the incoming replies and sorts them into their associated campaigns.

Preferably the means of displaying an advertisement can be television, magazines, newspapers, billboards films and/or the Internet.

Preferably the advertisement can be broadcast on radio or other non-visual means.

Preferably the computerised means for comparing and matching the participant's short text message response is a computer database which is connected by a virtual private network via the Internet to the SMS provider.

Preferably the computerised means also includes means for recording the number of correct and incorrect responses made by participants and the number of reply messages sent to the participants.

Preferably the computerised means can accommodate a number of phone numbers and/or groups of reference records corresponding to different advertisement offers or surveys conducted and a record is kept of the frequency of responses to each phone number or group of records, so that quantitative data such as the frequency or total number of consumer or voting response to a particular promotion or survey can be obtained.

Preferably the short text message response of a participant or consumer is a single word which can be easily compared and matched against a reference list of "correct" words stored on the computer database.

Preferably the Internet website to which the participant is instructed to access is a dedicated website which centrally co-ordinates all incoming SMS messages and provides the participants with further information in order to continue or proceed to the next step of the marketing or survey system.

In another aspect the invention resides in an interactive marketing and/or survey system utilising short message systems (SMS) provided on mobile or cell phones including in combination a means of displaying an advertisement, the advertisement inviting a participant to respond with a short text message via SMS on a mobile or cell phone, computerised means for comparing and matching the participants short text message with one or more retained reference records, wherein in operation, if the participant's short text message matches any of the one or more records, a reply message is sent by said computerised means to the participant's mobile or cell phone instructing the participant to proceed to a next step, typically to access an Internet website.

Preferably the means of displaying an advertisement can be television, magazines, newspapers, billboards, films and/or the Internet.

In the alternative the advertisement can be broadcast on radio or other non-visual means.

Preferably the computerised means for comparing and matching the participant's short text message response is a computer database which is connected by a virtual private network via the Internet to the SMS provider.

Preferably the computerised means also includes means for recording the number of correct and incorrect responses made by participants and the number of reply messages sent to the participants.

Preferably the computerised means can accommodate a number of phone numbers and/or groups of reference records corresponding to different advertisement offers or surveys conducted and a record is kept of the frequency of responses to each phone number or group of records. By such means quantitative data such as the frequency or total number of consumer or voting response to a particular promotion or survey can be obtained.

Preferably the short text message response of a participant or consumer is a single word which can be easily compared and matched against a reference list of "correct" words stored on the computer database.

Preferably the Internet website to which the participant is instructed to access is a dedicated website which centrally co-ordinates all incoming SMS messages and provides the participants with further information in order to continue or proceed to the next step of the marketing or survey system.

There is a present and developing ability to display short text messages on mobile or cell phones by what is known as short message services (SMS). It is envisaged that such short text messages can be used as a means of advertising as well as for obtaining consumer feed back from existing main stream advertising media inclusive of television, radio, films, magazines, newspapers, bill boards and the Internet.

With the growth of the mobile or cell phone market worldwide and in particular the acceptance and use of SMS (Short Message Service) there has now opened up an opportunity for applications using this technology.

Typical mobile phone users carry their phones constantly as they go about their day to day business such as when reading the morning paper, travelling to work, passing billboards, reading magazines, and watching television. If they notice an advertisement which invites them to take action such as to "Win a trip" or "Give us your opinion" mobile phone users are more likely to respond if the process required is low cost, quick and simple when compared to making a conventional phone call or posting a letter.

Importantly the present invention embraces what is regarded as a "pull" service as it is the consumer who actually initiates the transaction so that the implementation is considered to be "friendly". Unsolicited messages are not desirable in the mobile phone industry and the present system overcomes that requirement. The subject invention involves the application of a database having conditional filtering criteria to correlate a consumer's response or short text message to an advertising client's promotional offer. Criteria chosen in the advertiser's promotion will be used to determine the appropriate reply message or consumer response. In addition, by offering incentives to respond to advertisements, consumers will provide real time feedback indicating the effectiveness of the advertisements. The content of a particular response can indicate the consumer's recognition of the product or his or her opinion of the product. By this means, valuable survey evidence can be obtained. The content of the response can also provide the location and/or the publication in which the advertisement appeared. In the case of television or radio advertising the station which broadcasted the advertisement can also be identified by the particular response message. Multiple promotions could be run simultaneously using the same destination phone number as the content of the SMS will be specific to and will identify the particular promotion. Furthermore, to make it easier for participants, they can also store the phone number for later use. As competition participants are directed to a website by notifying the particular 'www' web address location in the SMS reply message, revenue from hits on the website can be generated. Real time voting or survey evidence can also be collected by this means. By using a special data base application, multiple voting by the same voter on the same mobile phone can be eliminated. Furthermore, real time graphical and statistical reports can be generated and supplied to clients of the service via a secured Internet interface system.

BRIEF DESCRIPTION OF THE DRAWINGS

In order to understand the invention more fully, reference is made to the accompanying illustrations wherein:

FIG. 5: shows a worksheet of the invention in operation, and

DETAILED DESCRIPTION OF THE DRAWINGS

Example 1

Figure 1:
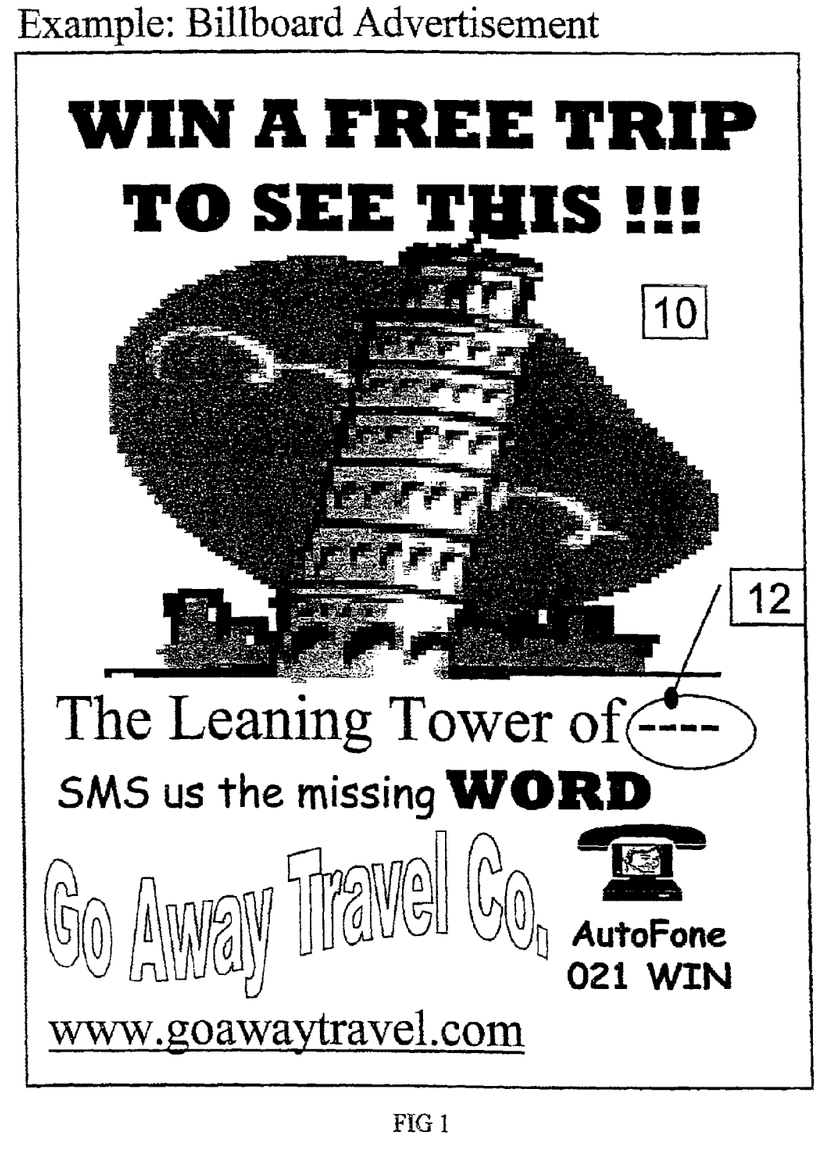
FIG. 1: shows an example of an advertisement requiring an SMS texted response according to Example 1.

FIG. 1 of Example 1 shows an example of an advertisement 10 inviting a participant to call a telephone number and to key in an appropriate alphanumeric response 12, and in this case, the word "PISA".

Figure 2:
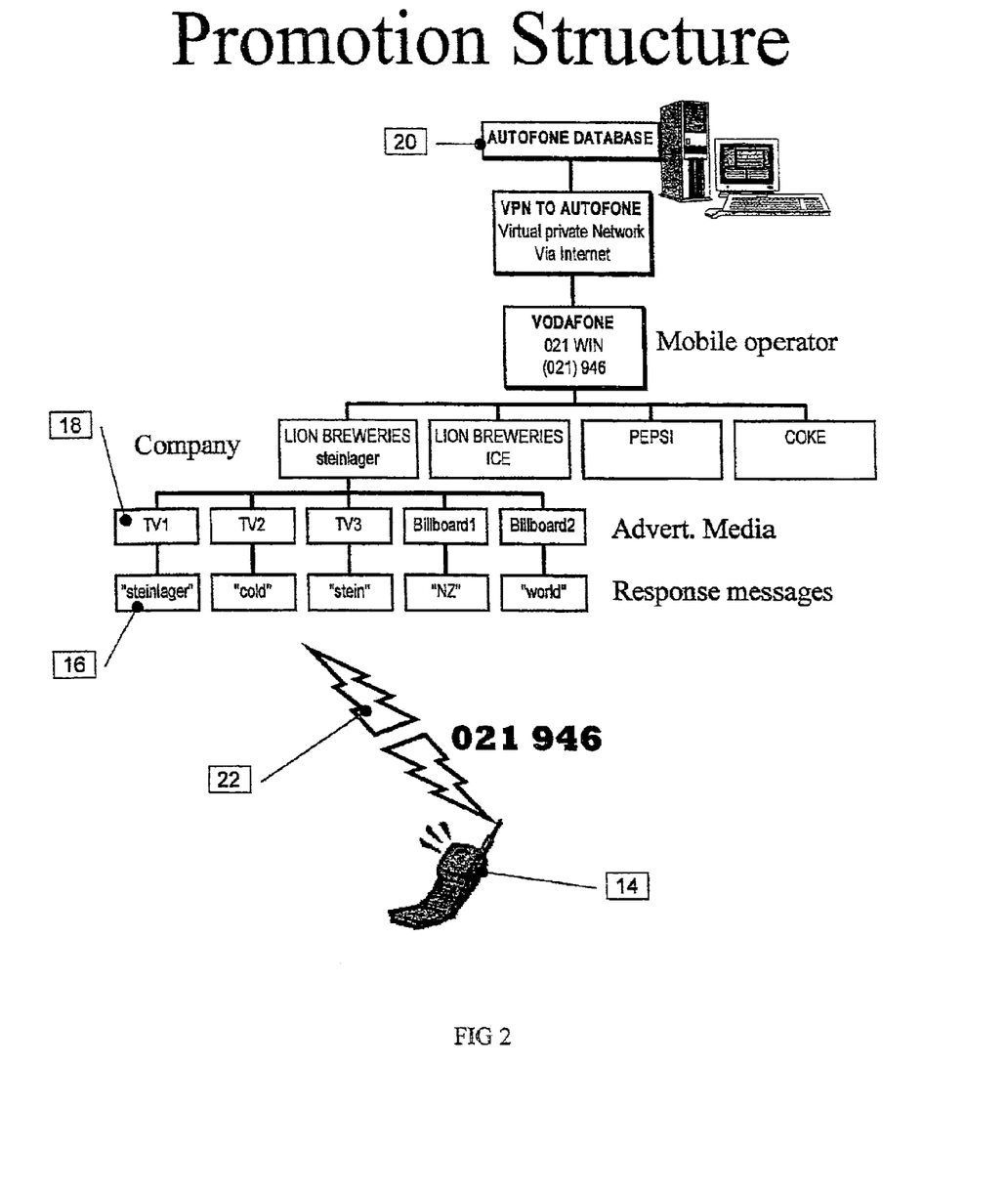
FIG. 2: shows a flow diagram of the components of the invention according to Example 1.

FIG. 2 shows a flow diagram or schema outlining the various components of the invention according to Example 1. In response to an advertisement such as that as shown in FIG. 1, a participant sends a message on a mobile or cell phone 14 and enters the appropriate alphanumeric response or short texted message 16. The response is specific to a particular promotion and the location or where the advertisement was broadcasted from 18 or displayed can be recorded by the computer database 20 which compares and matches the participant's response to a reference list retained in the computer database. If there is a correct match, such as the word "PISA" in the abovementioned example, a short message system (SMS) text reply 22 is sent to the participant's mobile or cell phone instructing the successful participant to access a specific website on the Internet. The participant can then obtain further details on how to progress in the competition or advertising promotion or survey from the referred website. It is envisaged that with the rapid development in information technology and particularly that concerning mobile and cell phones with Internet access, the participants can then access the website directly from their mobile or cell phones without the need of a personal or laptop computer.

Figure 3:
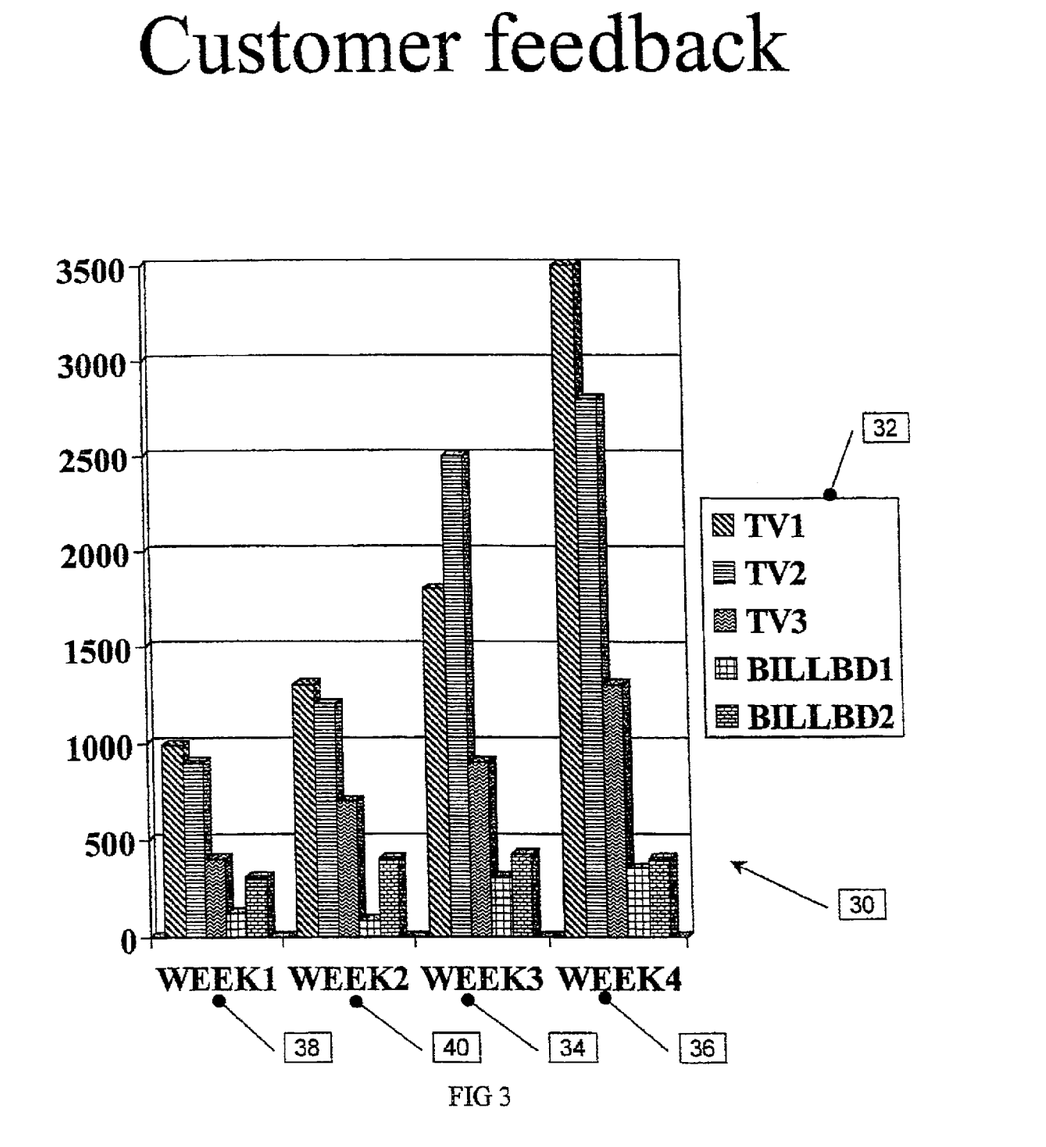
FIGS. 3 and 4: show examples of statistical analyses in the form of bar charts and frequency distribution graphs of the invention in operation.

Referring now to FIG. 3 there shown a bar chart 30 of the number of calls made to a particular advertisement advertised by three television stations and on two bill boards 32. By analysing the bar chart, the effectiveness of the mode of advertising can be gauged from the y-axis, which shows the frequency of calls made to the advertisement. Along the x-axis is shown the duration of the survey, which in this case was over a period of four weeks with the results of each week shown. It will be obvious to the skilled addressee that the frequency of calls made in the later weeks 34, 36 should be greater than those made in the earlier weeks 38, 40 because more consumers would be exposed to the advertisement over time.

Figure 4:
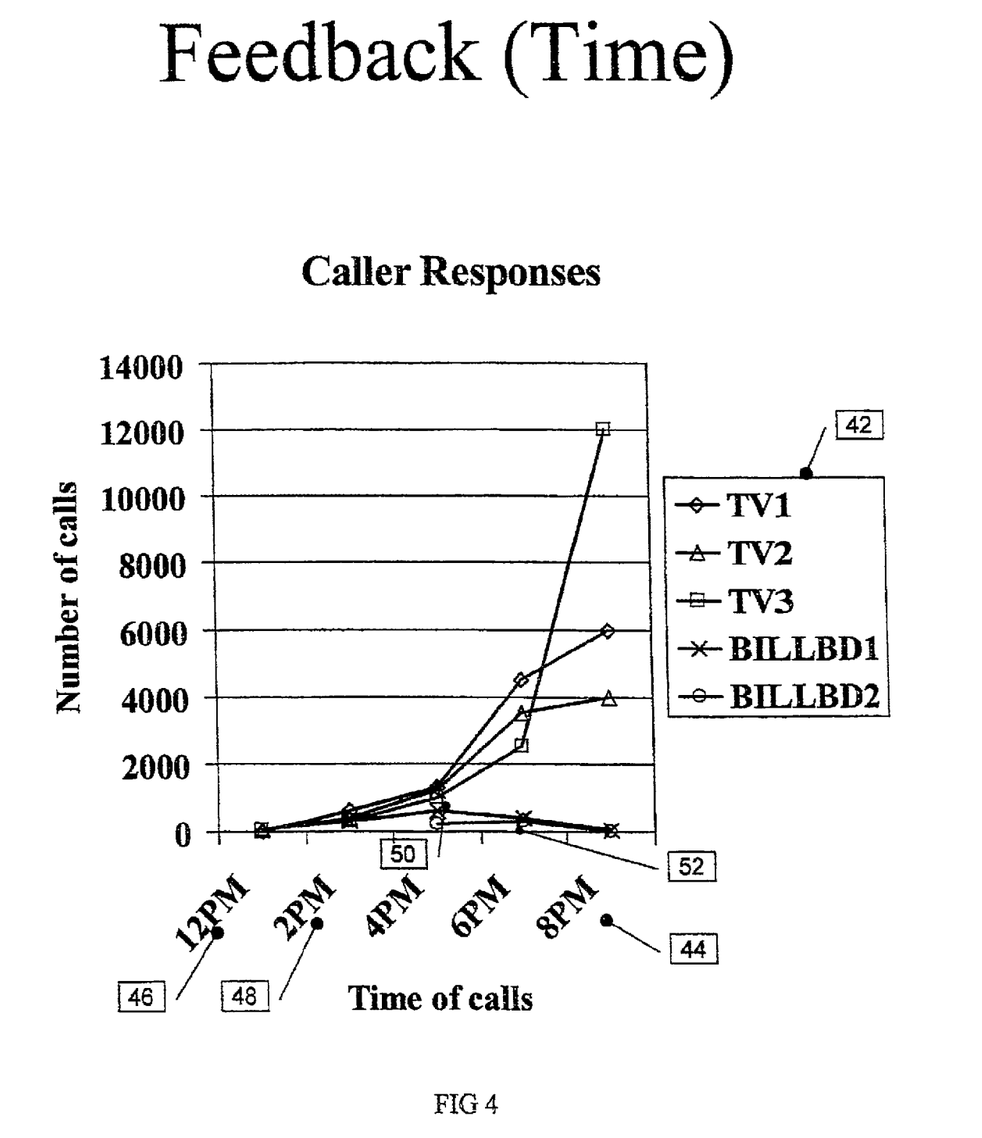

FIG. 4 shows the number of calls made on the y-axis compared to the time of day along the x-axis at which the call is made for an advertisement which was displayed on the three television stations and two bill boards 42 as mentioned previously for FIG. 3.

As far as the advertisement being broadcast by the three television stations from FIG. 4 it can be concluded that the 8 pm slot 44 obtained the most responses as compared to when the advertisement was shown at 12 pm 46 or 2 pm 48 in the afternoon wherein there would have been limited viewing. In contrast responses to the advertisement being displayed on billboards peaked at 5 pm 50 and 7 pm 52 respectively which indicates that effectively this type of advertisement has the greatest exposure when consumers are leaving their work places and possibly as they are driving home.

Referring now to FIG. 5 which shows a work sheet 60 wherein the various competitions or advertising clients are shown at the top of the columns 62,64. The appropriate short text message responses 66, 68 are shown under each column together with the number of matches 70, 72 of the correct response as well as the number of entries recorded 82,84. If a correct match is made between the recorded reference list and the participant's response, a text message 80 inviting the participant to access a website is displayed on the participant's mobile or cell phone (not shown). The number of entries received 82, 84 is recorded which enables a breakdown of the frequency or popularity of the particular competition or survey to be analysed.

Figure 6:
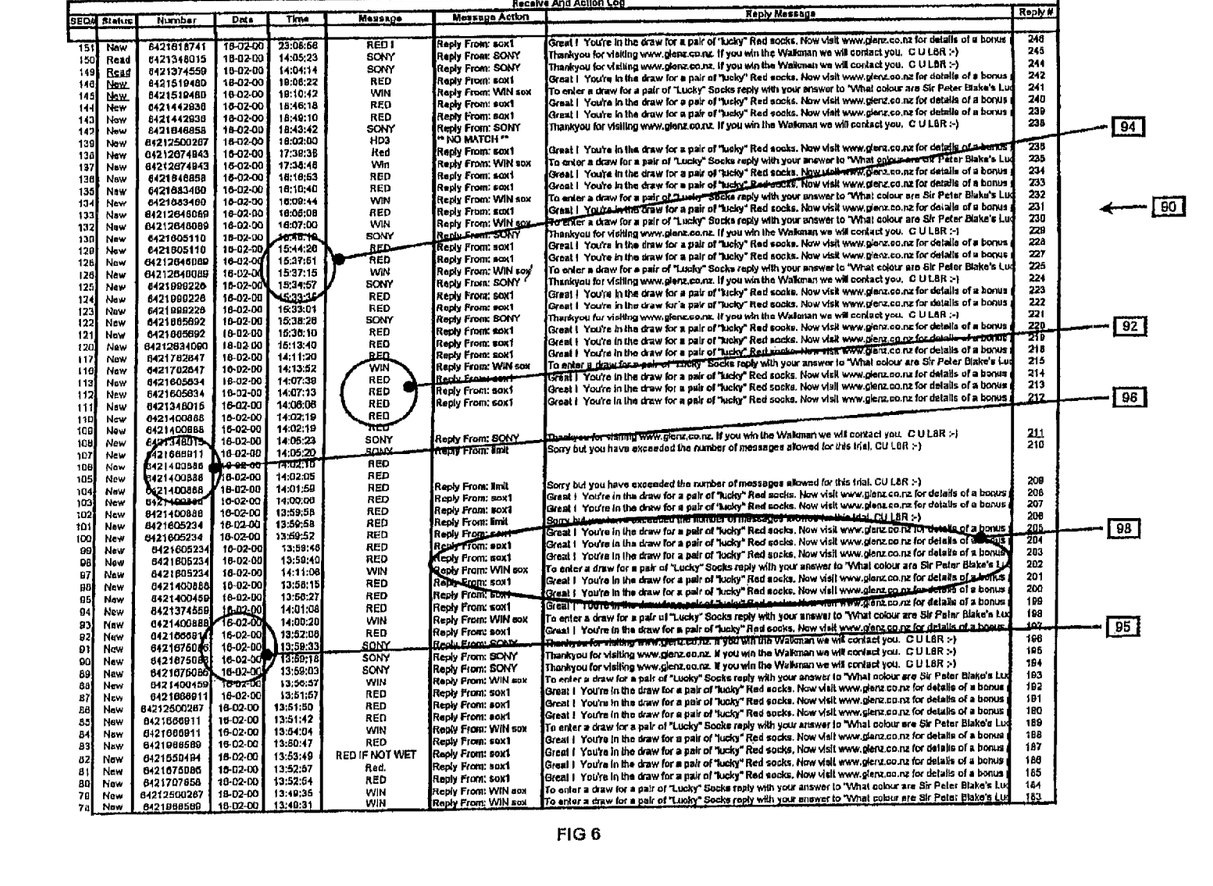
FIG. 6: shows a log of calls made in testing the invention.

FIG. 6 shows a log of calls received 90 requiring a particular response 92 and the times 94 and dates 95 at which the calls were made and the phone numbers 96 which were received and replied to. The particular response and identification of the client are shown 98. By analysing such a log the popularity or frequency of calls made in response to a particular advertisement or survey question can also be analysed.

Example 2

Product Promotion Example

Figure 7:
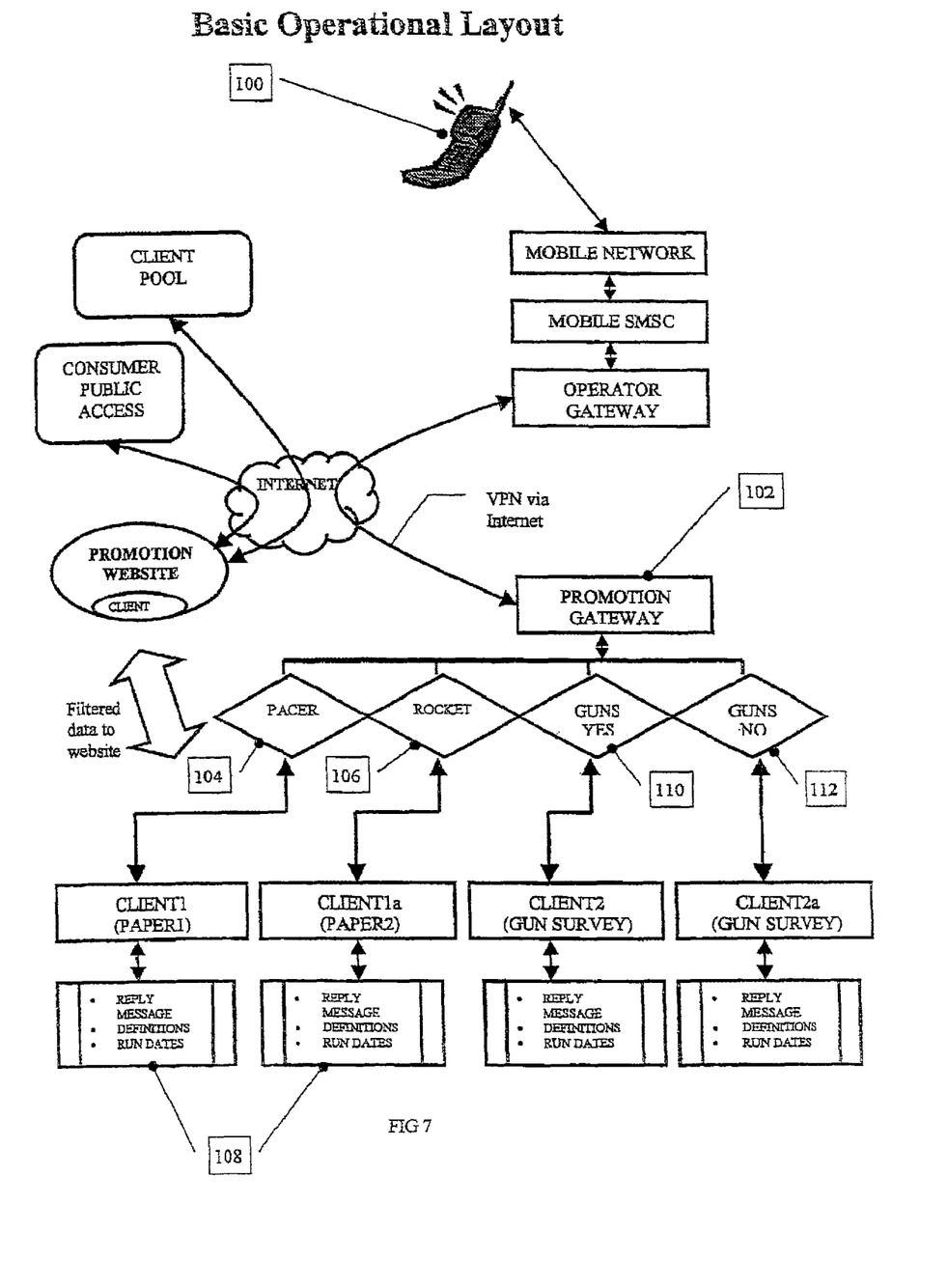
FIG. 7: shows a scheme of an operational layout of the invention according to Example 2 and Example 3 of the invention.

Referring to FIG. 7 there is shown an advertisement by the client ("1") and ("1a"), for example, printed in 2 morning papers (not shown) promoting a new model of running shoe called "Pacer Rockets".

Reader 1 reads the advertisement in paper 1 (not shown) and is invited to enter a draw to win a free pair of the shoes by sending an SMS containing the word "PACER" to number 345678.

Reader 2 reads the advertisement in paper 2 (not shown) and is invited to enter a draw to win a free pair of the shoes by sending an SMS containing the word "ROCKET" to number 345678.

1. Reader 1 and Reader 2 reach for their mobile phones 100 and type in the word "PACER" and "ROCKET" depending on which paper they are reading. In both cases they send this message to 345678.
2. The messages are received at the Promotion gateway 102 of the computer database. The messages contain the mobile number, date sent, time sent and the message text.
3. The message containing the word "PACER" is processed by a client's application called, "paper 1", 104 searching for the word "PACER". Likewise, the message containing the word "ROCKET" is processed by a client's application called, "paper 2" 106 searching for the word "ROCKET".
4. In this case the same client owns both applications. Both applications in this example simply respond with the same message 108 advising that the entry into the prize draw has been accepted and an invitation is made to visit a website, e.g. "Thank you for entering our PACER ROCKETS prize draw. We will contact you on this number if you are the winner. Visit www.pacerrockets.com for more details."

The transaction is now complete.

Numerous client applications can exist so long as the incoming message from the consumer is always unique.

By running the same advertisement in two newspapers but by varying the word content of the message required to enter the draw the client can obtain answers to the following questions.

How effective was the advertisement in paper 1 compared to paper 2?
What time did the consumers read the advertisement?
What date did the consumers read the advertisement?
Did this advertisement result in a Website visit? The Website can determine this by direct association with the advertisement.

Example 3

Vote or Opinion Poll Example

Referring also to FIG. 7, a television station runs a controversial news story and is seeking public opinion of a new law that would allow guns in schools.

Viewers are invited to join a real time survey where they can send an SMS indicating that they either approve of the new law by sending a message "guns yes" 110. Or if they disapprove they can send the message "guns no" 112. The following steps then ensue:

1. Concerned viewers reach for their mobile phones 100 and send their vote message to number 12345. All voters use this number regardless of the client television station.
2. The messages are received at the Polling gateway 102 of the computer database and routed to one or two applications 110, 112.
3. In the case of a "YES" vote a message is returned to the voter for example, "Your vote in favour of guns in schools has been accepted. So far 10% of voter's agree with you. Stay tuned for the final results or visit www.tvnewsco.com."
4. In the case of a "NO" vote a message is returned to the voter for example, "Your vote against allowing guns in schools has been accepted. So far 90% of voter's agree with you. Stay tuned for the final results or visit www.tvnewsco.com."

The transaction is now complete.

The TV station has a real time, private connection to a specially allocated page on the polling gateway website. The results of the messages are graphically and statistically displayed here in real time indicating the number of "yes" and "no" votes. The TV station can either show this page directly or generate a customised display based on this information.

Advantages

Cost Advantage of SMS

Existing methods of customer feedback include "900" numbers that attract typically high usage rates to the participant. Rates of a few dollars per minute are not uncommon. This can cause consumer reluctance particularly when younger family members can cause huge phone bills to accumulate. The cost of an SMS typically is half that of posting a letter and in some cases is free. Up to 160 characters of text can be sent using a standard SMS.

Time Advantage of SMS

The use of "physical" mail is decreasing as people move to electronic alternatives such as email. At present, email is still emerging in the mobile phone market so it does not have the convenience factor of SMS. Physical mail requires a larger effort on behalf of the consumer and replies are not immediate.

Interactive Advantage of SMS

When an SMS is sent from a mobile phone the overall delivery time is typically a few seconds. Third party applications that are connected to the SMS gateway should be able to respond in a similar time frame. Intelligent applications can create a 2-way dialog between the consumer and client application in order to request further consumer information or simply to inform the consumer.

Transaction Possibilities

The SMS reply message can inform the consumer that their message has been processed. It may also contain invitations to send a further message to complete the transaction. Invitations to visit Web sites belonging to or linking the promoter client may be made. In the case of an opinion poll or vote system indications may be made of the poll progress such as the number of "YES" or "NO" votes received to date.

Existing Promotion Structures

Existing methods of obtaining customer feedback require a unique destination that is selected by the consumer and that shows the process for them.

With voice based phone applications, this may necessitate the dialling of a unique phone number or dialling a number and selecting a destination by a menu driven process, e.g. Press 1 for "Shoes" or Press 2 for "computers".

With physical mail or email responses an address is required and often a sub address or department has to be indicated, e.g. Marketing promotions attn Shoes competition.

SMS Multi Client

By using a common number for SMS delivery, messages can be automatically routed to multiple clients based on the content of the message. This eliminates the need for a unique address/phone number for every client using this system.

By careful selection of the likely or required responses from all the client's customers' messages can be routed to the required client's application for processing and to be responded to.

Every message contains the mobile number of the originating message. This becomes the reply path for the client's application allowing a two-way transaction to occur.

Privacy Advantage of SMS

No subscription is required by the mobile user making it is available for use by any SMS capable phone. The only requirement is that the mobile number is forwarded with the message. One of the biggest fears of potential participants of such SMS transactions is that it may result in un-solicited "junk" messages as occurs with email. It is vital for the success of this system that it remains what the industry refers to as a "pull" service. This means that the participant only gets a message as a result of a message sent by them. The only variation would be notification of a prize that may occur several days or months after the original transaction. To help maintain privacy for consumers the operator of this system must retain ownership of all messages and never divulge mobile numbers to it's clients. Only statistical details should be passed to the client's prize-winner contact numbers.

Consumers do not need to pass on their identity further than their mobile number, which is an inherent feature of SMS. This will be a key feature that many consumers will prefer. The only requirement for personal details to be divulged would be in the case of prize delivery etc.

Branding and Association of the SMS Destination Number

To speed up the transaction and likelihood of response it would be ideal that the user already has the number stored in their mobile phone. This would allow consumers to concentrate on the transaction "keyword" rather than trying to remember the phone number. This is particularly useful in the case of Billboard advertising where time is limited. A custom logo (perhaps one for promotions and one for voting) would be used to associate the promotion with an SMS promotion that the consumer had used before. Because they already understand the process they are more likely to respond.

Variations

Finally it will be appreciated that various other alterations and modifications may be made to the foregoing without departing from the scope of this invention as claimed.

The invention claimed is:

1. An interactive voting system utilising short message service (SMS) short text messages, the interactive voting system comprising:
  broadcasting at least one question inviting a response from the public,
  indicating voting options in each said question by presenting to the public a number of predetermined SMS short text messages, each of the short text messages providing a defined answer to the broadcast question,
  inviting the public to participate by responding by SMS text message to an advertised destination number with a message that contains one of the voting options,
  receiving the incoming text messages from participants and counting them on a computer and providing information to the broadcaster, based on the number of votes for each of the predetermined replies.

2. A method as claimed in claim 1, wherein the questions are broadcast by television or radio and the television or radio broadcaster receives information on the number of votes cast, in real time.

3. A system as claimed in claim 2, wherein the results are broadcast in real time in order to update voters and/or to encourage more people to vote.

4. A method as claimed in claim 3, wherein the computer system sorts the incoming short text messages, records them in a database, and counts a vote on a particular question, once only from a particular cell phone number.

5. A method as claimed in claim 4, wherein the predetermined short text messages includes an identifier for that particular question, as well as an indicator of a vote for or against that particular question.

6. A method as claimed in claim 4, wherein if the question involves the selection of one or more answers from a plurality of candidates, then a number of votes for each candidate is recorded and broadcast either as a percentage, or numerical count, so that the participants can see or hear the number of votes cast for their chosen candidate.

7. A method as claimed in claim 4, wherein the computer is programmed to send a reply message to each voter, acknowledging their vote.

8. A method as claimed in claim 7, wherein the reply message includes details of the votes cast.

9. A method as claimed in claim 8, wherein the reply message includes details of a web site related to the question.

10. A method as claimed in claim 9, wherein the web site provides real time display of the votes cast.

11. A method as claimed in claim 10, wherein the web site provides advertising or products or services, alongside the results.

12. An interactive system utilizing Short Message Service (SMS) short text messages, the interactive system comprising:
  a first advertisement and a second advertisement each advertising an identical product or service via non-SMS based media, wherein each advertisement invites one or more participants to respond via a communication device to a single predetermined phone number, wherein each advertisement includes distinct content not present in the other advertisement, and wherein each advertisement includes instructions requesting the one or more participants to respond to the advertisement by sending a predetermined SMS short text message to the single predetermined phone number; and a computer system for receiving a short text message sent from the one or more participants by SMS to the predetermined phone number, the computer system adapted to identify the received short text message as being in response to either the first advertisement or, the second advertisement and not the other advertisement by searching a content of the received short text message and locating at least a portion of the distinct content associated with the first or second advertisement which the responder is responding to in the content of the received short text message.

13. The system of claim 12, wherein the distinct content of the first advertisement indicates that the first advertisement was presented in a first predetermined area and wherein the distinct content of the second advertisement indicates that the second advertisement was presented in a second predetermined area different than the first predetermined area in which the first advertisement was presented.

14. The system of claim 13, wherein the distinct content of the first advertisement indicates that the first advertisement was presented during a first predetermined time slot and wherein the distinct content of the second advertisement indicates that the second advertisement was presented during a second predetermined time slot different than the first predetermined time slot in which the first advertisement was presented.

15. The system of claim 12, wherein the distinct content of the first advertisement indicates that the first advertisement was presented by a first advertising entity and wherein the distinct content of the second advertisement indicates that the second advertisement was presented by a second advertising entity separate from the first advertising entity.

16. The system of claim 12, wherein the product or service is a polling service requesting a response to a survey question.

17. The system of claim 12, wherein the first advertisement is of a first type of media and the second advertisement is of a second type of media different than the first type of media.

18. The system of claim 17, wherein the first and second types of media are selected from a group consisting of television, radio, printed material, billboard, film, and internet.

19. The system of claim 12, wherein the computer system is adapted to automatically send a response via SMS to the received short text message containing additional information related to the product or service.

20. The system of claim 19, wherein the response includes instructions to access an internet website related to the product or service.

21. The system of claim 19, wherein the product or service is a polling service and the predetermined short text message includes an answer to a survey question, and wherein the computer system is adapted to automatically record a number of responses made by the one or more participants having a first predetermined answer and also record a number of responses made by the one or more participants having a second predetermined answer, and wherein the automatically sent response includes an indication of whether more respondents have answered the survey question with the first predetermined answer or the second predetermined answer.

22. The system of claim 12, further comprising a third advertisement advertising via non-SMS based media a, different product or service than advertised by the first and second advertisements, wherein the third advertisement invites one or more participants to respond via a communication device to the single predetermined phone number, wherein the third advertisement includes distinct content not present in the first or second advertisements, and wherein the computer system is adapted to identify the received short text message as being in response to either the first, second, or third advertisement and not the other advertisements by searching the content of the received short text message and locating at least a portion of the distinct content associated with the first, second, or third advertisement which the responder is responding to in die content of the received short text message.

23. The system of claim 14, wherein the first and second advertisements are sponsored by a first entity and the third advertisement is sponsored by a second entity separate from the first entity, wherein the computer system is adapted to automatically route the received short text message received via SMS to either the first entity or the second entity based on whether the portion of the distinct content identified by the computer system in the content of the received short text message is associated with the first, second, or third advertisement.

24. The system of claim 14, wherein the distinct content is a single word or a single string of characters.

25. The system of claim 14, wherein the first advertisement and second advertisement each invite the one or more participants to enter a draw to win a prize by responding to the first or second advertisement by texting via SMS the predetermined short text message to the predetermined phone number.

26. An interactive system utilising short message service (SMS) text messages, the system comprising:
presenting a request for a vote between different possibilities,
inviting a participant to respond with one of a number of different defined short text message via SMS,
computerised means for comparing and matching the participants' short text messages with one or more retained reference records, wherein in operation, if a participant's short text message matches any of the one or more retained reference records, information from the message is stored in a database.

27. A system as claimed in claim 26, wherein the request invites participants to respond to a common "reply to" telephone number.

28. A system as claimed in claim 26, wherein all requests associated with the system use the same common "reply to" telephone number but each request campaign uses distinct pre-allocated short text message(s) and the computerised means analyses and displays the incoming replies and sorts them into their associated requests.

29. A system as claimed in claim 26, wherein the means of presenting a request is selected from television, magazines, newspapers, billboards films and/or the Internet.

30. A system as claimed in claim 26, wherein the request is broadcast on radio or other non-visual means.

31. A system as claimed in claim 26, wherein the computerised means for comparing and matching the participant's short text message response is a computer database which is connected by a virtual private network via the Internet to the SMS provider.

32. A system as claimed in claim 26, wherein the computerised means also includes means for recording the number of votes made by participants.

33. A system as claimed in claim 26, wherein the computerised means can accommodate a number of phone numbers and/or groups of reference records corresponding to different requests or surveys conducted and a record is kept of the frequency of responses to a particular request each phone number or group of records, so that quantitative data such as the frequency or total number of voting response to a particular request or survey can be obtained.

34. A system as claimed in claim 26, wherein the short text message response of a participant is a single word which can be compared and matched against a reference list of "correct" words stored on the computer database.

* * * * *

UNITED STATES PATENT AND TRADEMARK OFFICE
CERTIFICATE OF CORRECTION

| | | |
|---|---|---|
| PATENT NO. | : 8,380,566 B2 | Page 1 of 1 |
| APPLICATION NO. | : 13/568727 | |
| DATED | : February 19, 2013 | |
| INVENTOR(S) | : Glen David Smith | |

It is certified that error appears in the above-identified patent and that said Letters Patent is hereby corrected as shown below:

In the Claims

Column 8, line 7, cancel the text beginning with "1. An interactive voting system" to and ending "for each of the predetermined replies" in column 8, line 22, and insert the following claim:

--1. An interactive voting method utilising short message service (SMS) short text messages, the interactive voting method comprising:
    broadcasting at least one question inviting a response from the public,
    indicating voting options in each said question by presenting to the public a number of predetermined SMS short text messages, each of the short text messages providing a defined answer to the broadcast question,
    inviting the public to participate by responding by SMS text message to an advertised destination number with a message that contains one of the voting options,
    receiving the incoming text messages from participants and counting them on a computer and providing information to the broadcaster, based on the number of votes for each of the predetermined replies.--

Column 8, line 27, cancel the text beginning with "3. A system for" to and ending "more people to vote" in column 8, line 29, and insert the following claim:

--3. A method as claimed in claim 2, wherein the results are broadcast in real time in order to update voters and/or to encourage more people to vote.--

Signed and Sealed this
Twenty-third Day of June, 2015

Michelle K. Lee
*Director of the United States Patent and Trademark Office*